April 16, 1968 S. M. SHERMAN 3,378,843
MONOPULSE TRACKING RADAR SYSTEM CAPABLE OF LOCATING
A PLURALITY OF UNRESOLVED TARGETS
Filed Nov. 29, 1966

Inventor:
SAMUEL M. SHERMAN

By Edward J Norton
Attorney

United States Patent Office 3,378,843
Patented Apr. 16, 1968

3,378,843
MONOPULSE TRACKING RADAR SYSTEM CAPABLE OF LOCATING A PLURALITY OF UNRESOLVED TARGETS
Samuel M. Sherman, Moorestown, N.J., assignor to Radio Corporation of America, a corporation of Delaware
Filed Nov. 29, 1966, Ser. No. 597,760
5 Claims. (Cl. 343—16)

ABSTRACT OF THE DISCLOSURE

There is disclosed a monopulse tracking radar system which is capable of resolving two or more targets within its radar beam by utilizing both the relative phase and amplitude (complex) information at each of the four feeds of the antenna of the monopulse radar, for each of a plurality of successive received target echo pulse signals, as well as the absolute magnitude of the total signal from each of the successive pulses. By utilizing both the phase and amplitude information contained in the received signals, it is possible to obtain a sufficient number of independent simultaneous equations whose solution will permit the resolution of each of the plurality of targets within the radar beam.

---

Figure 1:
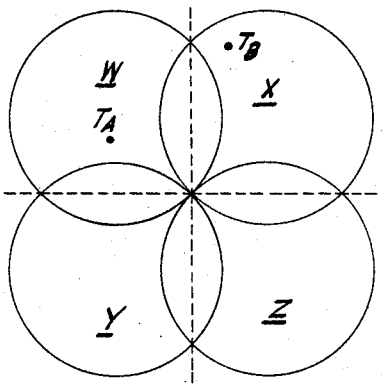

This invention relates to monopulse radar tracking systems and, more particularly, to such a system which is capable of individually locating two or more unresolved targets and determining their relative strengths and phases.

Monopulse radar tracking systems are well known in the art and are fully discussed in "Introduction to Monopulse," by D. R. Rhodes, published by McGraw-Hill Book Company, Inc., New York, in 1959, and in many other publications.

Briefly, the usual amplitude-comparison monopulse antenna comprises a parabolic reflector having four separate feeds which are symmetrically spaced about the axis of the reflector. The relative amplitudes and phases of signals received by each of the four feeds, respectively, depend upon the number and direction of targets within the beam angle of the antenna. More particularly, in the case of a single point source target, the phases of the signals received in each of the four feeds of the antenna will be equal to each other regardless of the direction of the target with respect to the axis of the antenna. However, the relative amplitudes of the signals received by the four respective feeds from a single target will be a function of the direction of the target with respect to the axis of the antenna. This amplitude information may be used in a servo loop to cause the monopulse antenna to track the single target.

In addition to the more usual amplitude-comparison monopulse tracking radar system, there exists a phase-comparison monopulse antenna system. In this case, a different type of multifeed antenna is used which results in the amplitudes of the signals received by the four respective feeds being equal to each other, but in which case the relative phases of signals received in the four respective feeds of the antenna from a single point source target are a function of the direction of the target. Although the present invention is equally applicable to phase-comparison monopulse radar tracking sytems, it is the usual amplitude-comparison radar tracking system which will be specifically disclosed.

When two or more unresolved targets are present within the beam of an amplitude-comparison monopulse radar tracking system, both the relative amplitude and the relative phase of the received signal in each of the respective four feeds vary. This has made it impossible to effectively utilize a conventional monopulse radar system when two or more targets are simultaneously being received because the tracking becomes erratic and sometimes impossible. The present invention makes it possible for a monopulse radar tracking system to individually locate two or more received targets so that any one of the targets (or some stable "centroid" of the targets) may be tracked.

In accordance with the present invention, it has been found that both the relative phase and amplitude information at each of the feeds for each of a plurality of successive target echo pulses, as well as the absolute magnitude of the total signal from each of the successive pulses, may be utilized to locate a plurality of otherwise unresolved targets. More particularly, in order to locate a particular angular component of two otherwise unresolved targets, it has been found that five independent parameters must be determined. These five independent parameters, as it turns out, are functions of the information received by a conventional monopulse antenna in response to the transmission of two successive pulses, although much of this information was not made use of prior to this invention. Putting it another way, the five parameters may be determined by solving five simultaneous equations which are functions of measurable data obtained from the received echoes from two transmitted radar pulses. In general, any number of unresolved targets may be located by utilizing the appropriate information received by a monopulse antenna in response to a sufficient number of successive transmitted pulses.

It is therefore an object of the present invention to provide a monopulse radar capable of determining the individual locations of a plurality of unresolved targets, as well as their relative strengths and phases.

Figure 2:
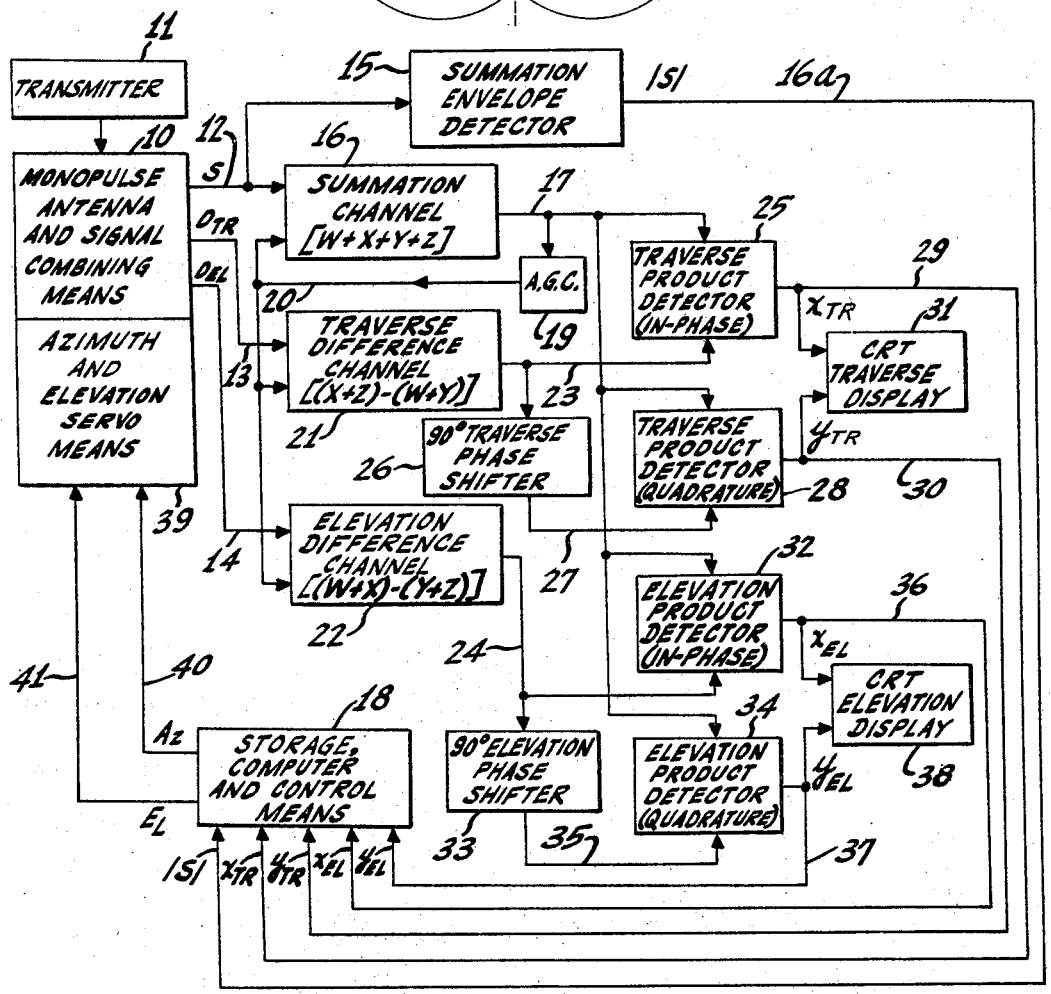

These and other objects, features and advantages of the present invention will become more apparent from the following detailed description taken together with the accompanying drawing, in which:

FIG. 1 is a typical radiation pattern of each of the four feeds of a monopulse antenna, with respect to each other, and FIG. 2 is a block diagram of a preferred embodiment of the present invention.

It should be understood that the various lead lines shown interconnecting the blocks in FIG. 2 do not necessarily consist of a single conductor or coupling means, but may include a plurality of conductors or coupling means.

Referring now to FIG. 1, there is shown the radiation pattern obtained from a typical amplitude-comparison monopulse antenna which comprises a parabolic reflector and four separate feeds symmetrically oriented about the axis of the parabolic reflector and located at a fixed distance therefrom. Shown in FIG. 1 is the radiation pattern obtained from each of these four feeds. More particularly, the upper left hand feed pattern is designated W, the upper right hand feed pattern is designated X, the lower left hand feed pattern is designated Y, and the lower right hand feed pattern is designated Z. The total radiation pattern of the monopulse antenna would, of course, be the vector sum of W, X, Y and Z. The patterns W, X, Y and Z are symmetrically distributed with respect to the antenna axis.

Further shown in FIG. 1 are two separate targets, $T_A$ and $T_B$, respectively, which are separately located, as shown in FIG. 1, with respect to radiation patterns W, X, Y and Z.

Past monopulse radar systems are extremely effective in tracking a single target, such as target $T_A$, by itself, or target $T_B$, by itself. However, when both targets $T_A$ and $T_B$ are located within the beam of the monopulse antenna, past monopulse radars have been completely unsatisfactory in tracking either of the targets or some stable "centroid" point which is a function of the locations of both of the targets because tracking becomes erratic or even impossible. The monopulse radar system shown in block form in FIG. 2, on the other hand, is very effective in tracking a target in the presence of two or more unresolved targets.

Referring now to FIG. 2 there is shown monopulse antenna and signal combining means 10. Monopulse antenna and signal combining means 10 includes a monopulse antenna together with microwave circuitry for applying successive pulses to be transmitted from transmitter 11 to each of the four feeds of the monopulse antenna, and microwave signal combining circuitry responsive to echo pulses received by the monopulse antenna for applying three separate signals to leads 12, 13 and 14, respectively. Each of these three separate signals is a phasor signal, i.e., it carries both amplitude and phase information. In particular, the sum signal applied to lead 12 consists of the sum of the target echo signals received by all of feeds W, X, Y and Z. The traverse difference signal applied to lead 13 consists of the difference between the sum of the target echo signals received by feeds W and Y and the sum of the target echo signals received by feeds X and Z.

It should be noted that although the rotational degrees of freedom of the antenna are in azimuth (about a vertical axis) and elevation (about a horizontal axis), the design of the antenna feed system and microwave combining circuitry is such that the signal applied to lead 13 is a function of the traverse (rather than azimuth) angle positions of the targets relative to the antenna axis. The traverse axis is perpendicular to the antenna axis and lies in a vertical plane. Thus, the traverse angle is proportional to azimuth, being equal to the product of azimuth angle multiplied by the cosine of the elevation angle.

The elevation difference signal applied to lead 14 consists of the difference of the sum of the target echo signals received by feeds W and X and the sum of the target echo signals received by feeds Y and Z.

The sum signal on lead 12 is applied as an input to both summation envelope detector 15 and summation channel 16. The output of summation envelope detector 15, which is proportional to the absolute magnitude of the sum phasor signal on lead 12 for each of successive transmitted pulses, is applied over lead 16a as a first input to storage, computer and control means 18.

The amplitude and phase information in the summation phasor signal on lead 12 is maintained intact in passing through summation channel 16 to the output lead 17 thereof. More particularly, summation channel 16 may include amplifiers and/or frequency converters, but does not include any device which eliminates the amplitude and phase information in the input applied thereto. Thus, the output appearing on lead 17 is a phasor signal containing identical information to the sum phasor signal on lead 12.

The output signal on lead 17 is applied to an automatic gain control circuit 19. The automatic gain control signal obtained on lead 20 is applied as a feedback input to summation channel 16 to keep the output of channel 16 at a constant amplitude, and also as input to traverse difference channel 21 and as an input to elevation difference channel 22. The traverse difference phasor signal present on lead 13 is applied as an input to azimuth difference channel 21 and the elevation difference phasor signal present on lead 14 is applied as an input to elevation difference channel 22. Each of traverse difference channel 21 and elevation difference channel 22 is similar in structure to that described above in connection with summation channel 16. It will therefore be seen that traverse difference channel 21 produces an output phasor signal on lead 23 which contains the same information as the phasor signal on lead 13 and that elevation difference channel 22 produces an output phasor signal on lead 24 which contains the same information as the phasor signal on lead 14. The whole purpose of the automatic gain control signal on lead 20 is to normalize channels 16, 21 and 22 with respect to each other as well as with respect to varying absolute magnitudes of the echo signals received on successive pulses.

The summation phasor signal present on lead 17 and the traverse difference phasor signal present on lead 23 are applied directly as first and second inputs to traverse product detector (in-phase) 25. In addition, the traverse difference phasor signal present on lead 23 is shifted 90 degrees in phase by means of phase shifter 26, and the summation phasor signal present on lead 17 along with the output of phase shifter 26 present on lead 27 are applied as first and second inputs to traverse product detector (quadrature) 28. Alternatively, the 90-degree phase shift could be applied to the sum phasor signal instead of to the traverse difference phasor signal. The output from traverse product detector 25 present on lead 29 is applied as an input to storage, computer and control means 18. Also, the output of traverse product detector 28 present on lead 30 is applied as an input to storage, computer and control means 18. In addition, the respective outputs present on leads 29 and 30 are applied as respective x and y deflection inputs to cathode ray tube traverse display 31.

In a similar manner, the summation phasor signal present on lead 17 and the elevation difference phasor signal present on lead 24 are applied directly as first and second inputs to elevation product detector (in-phase) 32. Also, the elevation difference phasor signal present on lead 24 after being shifted in phase 90 degrees by phase shifter 33 is applied as a second input to elevation product detector (quadrature) 34 over lead 35, while the summation phasor signal on lead 17 is applied as a first input to detector 34. The output of detector 32 present on lead 36 is applied as an input to storage, computer and control means 18 and the output of detector 34 present on lead 37 is also applied as an input to storage, computer and control means 18. The signals present on leads 36 and 37 are also applied as respective x and y deflection signals to cathode ray tube elevation display 38.

Storage computer and control means 18 applies information including an azimuth tracking signal to azimuth and elevation servo means 39 over lead 40, and applies an elevation tracking signal to azimuth and elevation servo means 39 over lead 41. Azimuth and elevation servo means 39 includes means for moving the monopulse antenna of means 10 so that a desired target or "centroid" is tracked.

Transmitter 11, monopulse antenna and signal combining means 10, summation channel 16, automatic gain control 19, traverse difference channel 21, elevation difference channel 22, traverse product detector (in-phase) 25, elevation product detector (in-phase) 32 and azimuth and elevation servo means 39 are all present in conventional monopulse radar tracking systems. However, in conventional monopulse radar tracking systems the output present on lead 29 of traverse product detector (in-phase) 25 is in effect directly connected to lead 40 (except for a simple geometrical conversion from traverse to azimuth) so that it alone controls the azimuth position of the monopulse antenna by means of the azimuth portion of azimuth and elevation servo means 39. Similarly, in conventional monopulse radar tracking systems the output present on lead 36 of elevation product detector (in-phase) 32 is in effect directly connected to lead 41 so that it alone controls the elevation position of the monopulse antenna by means of the elevation portion of azimuth and elevation servo means 39. The monopulse radar tracking system shown in FIG. 2 may be operated as a conventional monopulse tracking radar when there is no problem of two or more unresolved targets simply by operating a control switch within storage, computer and control means 18 which is effective in connecting lead 29 to lead 40 and lead 36 to lead 41.

It will be seen that the monopulse radar tracking system shown in FIG. 2, in addition to the elements making up a conventional radar tracking system, includes summation envelope detector 15, traverse phase shifter 26, traverse product detector (quadrature) 28, traverse display 31, elevation phase shifter 3, elevation product detector (quadrature) 34, elevation display 38 and the storage and computer means within block 18. With these means it is possible to resolve the locations of a plurality of targets.

In particular, by mathematical analysis it can be shown that the following relationships exist for the signals received from two independent targets in response to each of two successive transmitted pulses:

(1) $$x_1 + jy_1 = \frac{A + B(gr)e^{j\phi_1}}{1 + (gr)e^{j\phi_1}}$$

(2) $$x_2 + jy_2 = \frac{A + B(gr)e^{j\phi_2}}{1 + (gr)e^{j\phi_2}}$$

(3) $$\left|\frac{S_2}{S_1}\right|^2 = \frac{1 + (gr)^2 + 2(gr)\cos\phi_2}{1 + (gr)^2 + 2(gr)\cos\phi_1}$$

where $j$ is equal to the square root of minus one and the real and imaginary portions of Equations 1 and 2 may be equated separately to provide a total of five equations. Further, $x_1$ and $x_2$ are equal, respectively to the magnitudes of the output of in-phase product detector for a particular angular component (either traverse product detector 25 or elevation product detector 32 respectively) for each of first and second successive pulses, respectively, and $y_1$ and $y_2$ are equal, respectively to the magnitudes of the output of the quadrature product detector for the same particular angular component for each of the same first and second successive pulses, respectively. $|S_1|$ and $|S_2|$ are equal respectively to the magnitudes of the output from envelope detector 15 for each of the same first and second successive pulses, respectively. The parameter A manifests the aforesaid particular angular component (either traverse or elevation, respectively) of a first of the two independent targets with respect to the orientation of the monopulse antenna. The parameter B manifests this particular angular component of the second of the two independent targets. The parameter $(gr)$ is the product of the ratio of antenna voltage gains in the directions of the two targets and the ratio of backscatter voltage coefficients of the two targets and manifests the ratio of the amplitudes of the echo pulses from the two targets, respectively, which would have been received if each had been separately received. The parameters $\phi_1$ and $\phi_2$, respectively, manifest the relative phase of received echoes from the two targets for the aforesaid first and second successive pulses, respectively.

It will be seen that storage, computer and control means 18 has sufficient inputs applied thereto to permit the computer portion thereof to be programmed to solve for any or all of the five parameters, namely A, B, $(gr)$ $\phi_1$, and $\phi_2$, in each of traverse and elevation. Further, the computer portion of block 18 may be programmed to generate respective azimuth and elevation tracking signals applied to leads 40 and 41, respectively, which tracking signals are proportional to either angle A of the first target or angle B of the second target or, in the alternative, to some predetermined function of both angles A and B. In the latter case, the monopulse antenna may be made to track the geometric center between targets, or a weighted centroid point obtained by weighting the direction of each of the two targets in accordance with its relative echo signal strength.

Although the primary outputs of storage, computer, and control means 18 are the tracking signals on leads 40 and 41, additional outputs, not explicitly shown in FIG. 2, are available as by-products of the computation and may be used to aid in analyzing the nature of the targets. These outputs are the angles of the two targets and their relative amplitude and phase.

In the above discussion it is assumed that there are only two unresolved targets. If there are more than two unresolved targets which are to be located, sufficient simultaneous equations may be obtained by increasing the number of successive pulses which must be taken into consideration. Of course this would increase the complexity of the computation which the computer would have to perform.

There are practical situations where it is desired to resolve two targets which are not independent of each other. One such case is resolving an echo from a low elevation target from the echo obtained from its reflected ground image. Here, of course, the two apparent targets are not independent and, further, will always have the same azimuth. However, due to the multi-path problem of the reflected image target, a conventional monopulse radar tracking system has great difficulty in tracking a low elevation angle target in elevation. The present invention by making use of all the received information which becomes usefully available in the respective outputs of the in-phase elevation product detector and the quadrature elevation product detector makes it possible to accurately track low elevation angle targets. Furthermore, since the target and its image target are not independent, and their relationships in angle, amplitude, and phase are known, it is possible to reduce the number of independent variables sufficiently to utilize the information obtained from only a single received pulse to compute the true elevation angle of the actual target.

The cathode ray tube traverse and elevation displays 31 and 38, respectively, shown in FIG. 2 merely make it possible to monitor the received information in order to determine whether or not more than a single target is within the beam of the monopulse antenna. More particularly, so long as only a single target is within the beam, only the real term "$x$" appearing on the output of the in-phase product detector will be present, and there will be negligible output from the quadrature product detector, so that the imaginary "$y$" term will be substantially zero. On the other hand, when two or more targets are within the beam of the monopulse antenna the imaginary "$y$" term output of the quadrature product detector will become significant. This may be noted by an operator in the case of traverse on traverse display 31 and in the case of elevation on elevation display 38. This may be particularly desirable, since one might operate the radar tracking system shown in FIG. 2 in the conventional mode (with leads 29 and 36 effectively connected to leads 40 and 41, respectively) so long as the traverse and elevation displays indicate that only a single target is present. However, as the traverse or elevation display indicates that two or more targets are present, the monopulse radar tracking system shown in FIG. 2 may be switched into the so-called computer mode of the present invention in which the plurality of targets are resolved.

The fact that an imaginary term is present when two or more targets are within the monopulse antenna beam means that the signals derived from feeds W, X, Y, and Z shown in FIG. 1 are not all in phase and therefore their phasor sum, which is the summation signal appearing on lead 12, is smaller than it would be if they were all in phase. Therefore the power applied to summation envelope detector 15 is not maximum. Since the present invention provides information as to the presence of this imaginary component, if it exists, it would be possible to incorporate servo-operated variable phase shift means within that portion of block 10 comprising the microwave circuitry in a manner such as to null any imaginary component present in the sum phasor signal on lead 12. This would have the effect of bringing the signals from feeds W, X, Y, and Z into phase alignment for the sum phasor signal and thus providing maximum power transfer and maximum sensitivity for the monopulse radar tracking system.

Although only a preferred embodiment of the present invention has been described herein, it is not intended that the invention be restricted hereto, but that it be limited by the true spirit and scope of the appended claims.

What is claimed is:

1. In a monopulse radar tracking system comprising a transmitter, a monopulse antenna and signal combining means coupled to said transmitter for transmitting successive pulses therefrom and for receiving target echoes and for processing said received target echoes from each transmitted pulse into a sum phasor signal and at least one difference phasor signal, and first means including a first product detector having said sum and difference phasor signals applied thereto for producing a first output signal proportional to the in-phase product of said sum and difference phasor signals for each successive pulse; the improvement wherein said first means further includes phase shifting means for shifting the relative phase of said sum and difference phasor signals ninety degrees with respect to each other and a second product detector having said relatively phase shifted sum and difference phasor signals applied thereto for producing a second output signal proportional to the quadrature product of said sum and difference phasor signals for each successive pulse, and wherein said system further comprises second means for producing a third output which is a function of the absolute magnitude of said sum signal for each successive pulse, whereby the respective directions of a given plurality of unresolved targets with respect to the orientation of said monopulse antenna may be determined as a function of the respective values of said first, second and third output signals from a sufficient plurality of successive pulses.

2. The system defined in claim 1 wherein said difference phasor signal is the traverse difference signal of said system.

3. The system defined in claim 1, wherein said difference phasor signal is the elevation difference signal of said system.

4. The system defined in claim 1 further including a storage, computer and control means having said first, second and third output signals applied thereto for determining the following parameters by solving the following equations:

(1) $$x_1 + jy_1 = \frac{A + B(gr)e^{j\phi_1}}{1 + (gr)e^{j\phi_1}}$$

(2) $$x_2 + jy_2 = \frac{A + B(gr)e^{j\phi_2}}{1 + (gr)e^{j\phi_2}}$$

(3) $$\left|\frac{S_2}{S_1}\right|^2 = \frac{1 + (gr)^2 + 2(gr)\cos\phi_2}{1 + (gr)^2 + 2(gr)\cos\phi_1}$$

where the real and imaginary portions of Equations 1 and 2 may be equated separately to provide a total of five equations, and where $x_1$ and $x_2$ are equal, respectively, to the magnitudes of the first output signal for each of first and second successive pulses, respectively, $y_1$ and $y_2$ are equal, respectively, to the magnitudes of the second output signal for each of said first and second successive pulses, respectively, and $|S_1|$ and $|S_2|$ are equal respectively to the magnitudes of said third output signal for each of said first and second successive pulses, respectively, and where the parameter A manifests a particular angular component of a first of two targets with respect to the orientation of said monopulse antenna, the parameter B manifests said particular angular component of the second of said two targets, the parameter $(gr)$ manifests the ratio of amplitudes of the echo pulses from the two targets, respectively, which would have been received if each had been separately received and is the product of $(g)$ the ratio of antenna voltage gains in the directions of said two targets and the ratio $(r)$ of backscatter voltage coefficients of said two targets, and the parameters $\phi_1$ and $\phi_2$, respectively, manifest the relative phase of received echoes from said two targets for said first and second successive pulses, respectively.

5. The system defined in claim 4, further including servo means coupled to said monopulse antenna for controlling the orientation thereof in accordance with a tracking signal applied to said servo means, and means coupling said storage, computer and control means to said servo means to apply as said tracking signal a signal which is a predetermined function of at least one of said parameters A and B.

References Cited

UNITED STATES PATENTS

| | | | |
|---|---|---|---|
| 3,185,982 | 5/1965 | Case, et al. | 343—16 |
| 3,308,457 | 3/1967 | Winn | 343—16 X |

RODNEY D. BENNETT, *Primary Examiner.*

RICHARD A. FARLEY, *Examiner.*

J. P. MORRIS, *Assistant Examiner.*